United States Patent
Li et al.

(10) Patent No.: US 8,826,351 B2
(45) Date of Patent: Sep. 2, 2014

(54) SYSTEM AND METHOD FOR MANAGING STORAGE CAPACITY ON A DIGITAL VIDEO RECORDER

(75) Inventors: Jian Li, San Ramon, CA (US); Zhi Li, Martinez, CA (US); Kapil Shrikhande, Berkeley, CA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 692 days.

(21) Appl. No.: 12/208,937

(22) Filed: Sep. 11, 2008

(65) Prior Publication Data

US 2010/0064314 A1     Mar. 11, 2010

(51) Int. Cl.
*G06F 3/00* (2006.01)
*G06F 13/00* (2006.01)
*H04N 5/445* (2011.01)
*H04N 7/173* (2011.01)
*H04N 7/16* (2011.01)
*H04N 5/76* (2006.01)
*H04N 21/472* (2011.01)
*H04N 21/4335* (2011.01)
*H04N 21/643* (2011.01)
*H04N 5/765* (2006.01)

(52) U.S. Cl.
CPC .......... *H04N 5/76* (2013.01); *H04N 21/47214* (2013.01); *H04N 21/4335* (2013.01); *H04N 21/64322* (2013.01); *H04N 5/765* (2013.01)
USPC ............. 725/100; 725/38; 725/151; 386/295; 386/296; 386/298

(58) Field of Classification Search
None
See application file for complete search history.

(56) References Cited

U.S. PATENT DOCUMENTS

| | | | |
|---|---|---|---|
| 5,313,631 A | 5/1994 | Kao | |
| 5,675,789 A | 10/1997 | Ishii | |
| 6,775,461 B2 | 8/2004 | Poslinski et al. | |
| 7,882,074 B2* | 2/2011 | Lee et al. | 707/662 |
| 2002/0054750 A1 | 5/2002 | Ficco et al. | |
| 2003/0095180 A1* | 5/2003 | Montgomery | 348/143 |
| 2004/0019902 A1* | 1/2004 | Knudson et al. | 725/30 |
| 2004/0111756 A1* | 6/2004 | Stuckman et al. | 725/142 |
| 2004/0146282 A1 | 7/2004 | Lee | |
| 2004/0210932 A1* | 10/2004 | Mori et al. | 725/39 |
| 2004/0252982 A1* | 12/2004 | Iwahara et al. | 386/111 |
| 2005/0102704 A1* | 5/2005 | Prokupets et al. | 725/118 |
| 2005/0163466 A1* | 7/2005 | Liebhold et al. | 386/46 |
| 2006/0093320 A1* | 5/2006 | Hallberg et al. | 386/68 |
| 2006/0110127 A1 | 5/2006 | Iggulden | |
| 2006/0133775 A1* | 6/2006 | Ju | 386/95 |
| 2006/0230245 A1* | 10/2006 | Gounares et al. | 711/170 |
| 2007/0127887 A1* | 6/2007 | Yap et al. | 386/95 |
| 2007/0188902 A1* | 8/2007 | Patron et al. | 360/31 |
| 2007/0266218 A1* | 11/2007 | Achiwa | 711/170 |
| 2008/0104202 A1 | 5/2008 | Barrett et al. | |
| 2008/0154961 A1 | 6/2008 | Dougall | |
| 2008/0155607 A1* | 6/2008 | Klappert | 725/58 |
| 2008/0155623 A1* | 6/2008 | Ota | 725/109 |
| 2008/0166104 A1* | 7/2008 | Usui | 386/95 |
| 2009/0043958 A1* | 2/2009 | Kaneda et al. | 711/112 |
| 2009/0055590 A1* | 2/2009 | Takahashi | 711/119 |
| 2009/0100478 A1* | 4/2009 | Craner et al. | 725/87 |

* cited by examiner

*Primary Examiner* — Mushfikh Alam
(74) *Attorney, Agent, or Firm* — Guntin & Gust, PLC; Joseph Hrutka

(57) ABSTRACT

An Internet protocol television system includes a server that records content on a set-top box, determines storage capacity utilization, and when utilization is greater than a threshold, prompts to select other content on the storage device to be deleted.

11 Claims, 6 Drawing Sheets

SYSTEM AND METHOD FOR MANAGING STORAGE CAPACITY ON A DIGITAL VIDEO RECORDER

FIELD OF THE DISCLOSURE

The present disclosure generally relates to digital video recorders, and more particularly relates to recording content over an Internet protocol television system.

BACKGROUND

A digital video recorder (DVR) records television programs for later viewing. The programs may come from a cable, satellite, broadcast or other television source, or from an Internet protocol television (IPTV) network, and are typically in a standard-definition (SD) or high-definition (HD) format. A user selects the program to record, and the program is then stored in a digital format. If the DVR includes more than one tuner, the user may view a program on one channel and simultaneously record a program on a different channel.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
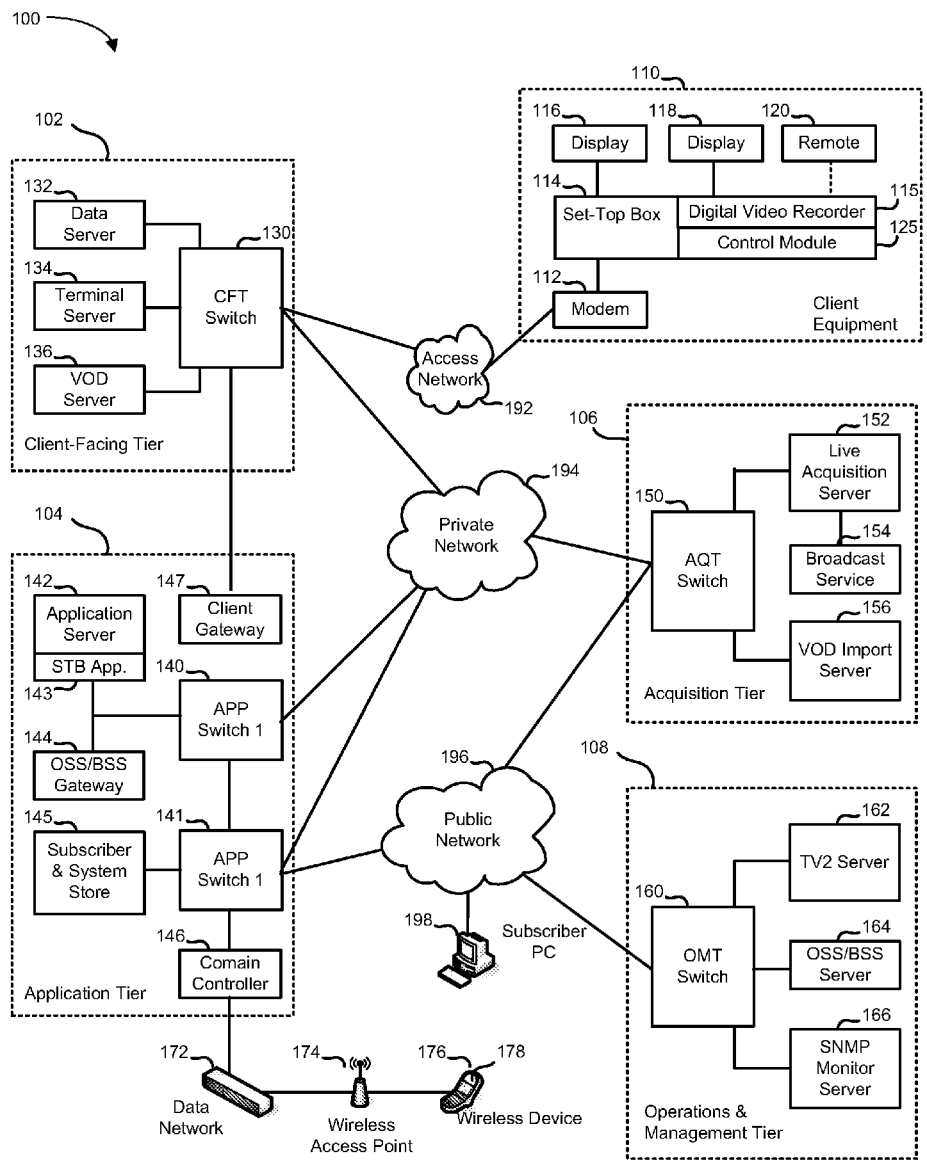
FIG. 1 is a block diagram illustrating an Internet Protocol Television (IPTV) system.

FIG. 1 shows an embodiment of an Internet protocol television (IPTV) system 100 including a client facing (CF) tier 102, an application tier 104, an acquisition tier 106, an operations and management (OM) tier 108, and one or more sets of client equipment 110. The client equipment 110 is typically located at the home or business premises of a subscriber to the IPTV system 100. The IPTV system 100 includes an access network 192, a private network 194, and a public network 196. Each tier 102, 104, 106, and 108 is coupled to one or more of the access network 192, the private network 194, and the public network 196. In an embodiment, the CF tier 102 is coupled to the access network 192 and the private network 194, the application tier 104 is coupled to the private network 194 and to the public network 196, the acquisition tier 106 is coupled to the private network 194 and to the public network 196, and the OM tier 108 is coupled to the public network 196. The client equipment 110 is coupled to the access network 192.

The networks 192, 194 and 196 communicate information between the tiers 102, 104, 106, and 108, and the client equipment 110. The access network 192 communicates information between the CF tier 102 and the client equipment 110. The private network 194 communicates information between the CF tier 102 and the application tier 104, between the application tier 104 and the acquisition tier 106, and between the acquisition tier 106 and the CF tier 102. The public network 196 communicates information between the application tier 104 and the acquisition tier 106, between the acquisition tier 106 and the OM tier 108, and between the OM tier 108 and the application tier 104. Information is also communicated directly between the CF tier 102 and the application tier 104, as described below. The information communicated between the tiers 102, 104, 106, and 108, and the client equipment 110 includes encoded television or audio content, data files, commands, procedures, other information, or any combination thereof.

The CF tier 102 can communicate with multiple sets of client equipment 110 over a wide geographic area, such as a regional area, a metropolitan area, a viewing area, or any other suitable geographic area that can be supported by the access network 192. The client equipment 110 includes a modem 112, a set-top box 114, two display devices 116 and 118, and a remote control 120. The set-top box 114 includes a DVR 115 and a control module 125. The modem 112 is coupled to the access network 192, and translates information from a form suitable for transmission over the access network 192 to a form suitable for use by the set-top box 114, and vice versa. In a non-limiting example, the modem 112 is coupled to the access network 192 via fiber-optic cables, a digital subscriber line (DSL), another network fabric, or any combination thereof.

The information that the CF tier 102 communicates to the modem 112 is sent to the set-top box 114, which processes the information into a form suitable for display by the display devices 116 and 118 or for recording by the DVR 115. The set-top box 114 receives digitally encoded content from the CF tier 102 for display on the display devices 116 and 118, or for recording by the DVR 115. The set-top box 114 can also receive data from the CF tier 102, and render or display the data on the display device 116 or 118. Further, the set-top box 114 can send data to the CF tier 102. Such data can include service requests, or commands from the subscriber, received by the set-top box 112 via the remote control 120. In this way, the subscriber can request services or information or respond to a request for information from the IPTV system 100. The control module 125 includes instructions that can be executed by the set-top box 114 to control the data flow between the subscriber and the IPTV system 100. The control module 125 can include an IPTV software platform such as Microsoft® TV IPTV Edition.

The control module 125 can facilitate data communication between the set-top box 114 and the IPTV system 100. For example, the control module 125 can include a procedure whereby the set-top box 114 receives a request to record a television program on the DVR 115, or sends a status to the IPTV system 100 that the television program has been recorded. Likewise, the control module 125 can include a procedure whereby the subscriber can interact with the IPTV system 100 to receive and execute a viewing preference that the subscriber has created in the IPTV system 100. Such preferences can be created via the remote control 120, or through a subscriber account that is accessible through the public network 196, such as through a subscriber's personal computer 198. A non-limiting example of a remote control 120 includes a hand-held controller device, a game controller device, a keyboard/mouse device, another control device, or any combination thereof.

The CF tier 102 includes a client-facing tier (CFT) switch 130, a data server 132, a terminal server 134, and a video-on-demand (VOD) server 136. The CFT switch 130 manages communication with the client equipment 110 through the access network 192 and with the application tier 104 and the acquisition tier 106 through the private network 194. The CFT switch 130 is coupled to the data servers 132 that store data transmitted in response to subscriber requests. The CFT switch 130 is also coupled to the terminal servers 134 that provide terminal devices, such as, a game application server, or other devices with a common connection point to the private network 194. The CFT switch 130 is also coupled to the VOD server 136.

The application tier 104 includes a first application tier (APP) switch 140, a second application tier (APP) switch 141, an application server 142, an operation systems and support/billing systems and support (OSS/BSS) server 144, a domain controller 146, a subscriber and system store 145, and a client gateway 147. The APP switches 140 and 141 manage communication with the CF tier 102 and the acquisition tier 106 through the private network 194. The APP switch 141 also manages communication with the acquisition tier 106 and the OM tier 108 through the public network 196. The first APP switch 140 is coupled to the second APP switch 141. The first APP switch 140 is also coupled to the application server 142 and to the OSS/BSS gateway 144. The application server 142 provides applications to the set-top box 114, so the set-top box 114 can provide functions such as display, messaging, processing of IPTV data and VOD material. The OSS/BSS gateway 144 includes operation systems and support (OSS) data, and billing systems and support (BSS) data.

The second APP switch 141 is coupled to the domain controller 146 and to the subscriber and system store 145. The domain controller 146 provides web access, for example, to subscribers via the public network 196. The subscriber and system store 148 includes account information that is associated with subscribers who access the IPTV system 100 via the private network 194 or the public network 196. The application tier 104 can also communicate data directly to the CF tier 102 through the client gateway 147. In this embodiment, the client gateway 147 is coupled directly to the CFT switch 130.

The client gateway 147 provides subscriber access to the private network 194 and the tiers coupled thereto. In particular, the set-top box 114 can access the IPTV system 100 via the access network 192 using information received from the client gateway 147. The access network 192 provides security for the private network 194. The client equipment 110 access the client gateway 147 via the access network 192, and the client gateway 147 allows the client equipment 110 to access the private network 194 once the client equipment 110 is authenticated or verified. Similarly, the client gateway 147 prevents unauthorized client equipment (not illustrated), such as hacker computers or stolen set-top box devices, from accessing the private network 194 by denying access to these devices beyond the access network 192.

For example, when the set-top box device 114 accesses the system 100 via the access network 192, the client gateway 147 verifies subscriber information by communicating with the subscriber and system store 145 via the private network 194, the first APP switch 140, and the second APP switch 141. Further, the client gateway 147 verifies billing information and status by communicating with the OSS/BSS gateway 144 via the private network 194 and the first APP switch 140. The OSS/BSS gateway 144 transmits a query across the first APP switch 140, to the second APP switch 141, and the second APP switch 141 communicates the query across the public network 196 to an OSS/BSS server 164 (described below). After the client gateway 147 confirms subscriber and/or billing information, the client gateway 147 allows the set-top box device 114 access to IPTV system 100 content and VOD server 136 content. If the client gateway 147 cannot verify subscriber information for the set-top box 114, such as when the set-top box 114 is connected to a different twisted pair, or when the set-top box 114 is stolen, the client gateway 147 denies transmissions to and from the set-top box device 114 beyond the access network 192.

The domain controller 146 communicates with the public network 196 via the second APP switch 141. The domain controller can include a web portal that allows a subscriber to access the IPTV system 100 using a personal computer 198. The domain controller 146 also communicates with a data network 172 that is connected to a wireless access point 174. The wireless access point 174 communicates with a subscriber's wireless device 176 to provide wireless access to the IPTV system 100. A non-limiting example of a wireless device 176 includes a cellular telephone, a personal digital assistant, a mobile e-mail device, a portable digital video device, another wireless device, or any combination thereof. The wireless device 176 includes a display device 178 for displaying information from the IPTV system 100. The display device 178 can include a text display, a picture display, a video display or any combination thereof.

The acquisition tier 106 includes an acquisition tier (AQT) switch 150, a live acquisition server 152, a broadcast service 154, and a video-on-demand importer server 156. The AQT switch 150 manages communication with the CF tier 104 and the application tier 104 through the private network 194, and with the application tier 104 and the OM tier 108 through the public network 196. The AQT switch 150 is coupled to the live acquisition server 152, and the video-on-demand importer server 156. The live acquisition server 152 acquires television content from the broadcast service 154. The live acquisition server 152 can send the television content to the AQT switch 150 for transmission to the CF tier 102 via the private network 194. The television content is further encoded at the data server 132, and sent to the client equipment 110 via the access network 192. The set-top box 114 receives the television content from the modem 112, decodes the television content, and transmits the content to the display devices 116 and 118 according to commands from the remote control device 120.

Additionally, the VOD importer server 156 receives content from one or more video-on-demand sources that can be outside the IPTV system 100, such as movie studios and programmers of non-live content. The VOD importer server 156 transmits the video-on-demand content to the AQT switch 150, and the AQT switch 150 communicates the material to the CFT switch 130 via the private network 194. The video-on-demand content is stored on the VOD server 136. When a subscriber issues a request for VOD content to the set-top box 114 through the remote control 120, the request is transmitted over the access network 192 to the VOD server 136 via the CFT switch 130. Upon receiving such a request, the VOD server 136 can retrieve requested VOD content and transmit the content to the set-top box or 114 across the access network 192 via the CFT switch 130.

The OM tier 108 includes an OM tier (OMT) switch 160, a TV2 server 162, the OSS/BSS server 164, and a simple network management protocol (SNMP) monitor server 166. The OMT switch 160 manages the communication between the OM tier 108 and the public network 196. The OMT switch 160 is coupled to the TV2 server 162, the OSS/BSS server 164, and the SNMP monitor server 166 that monitors network devices. The TV2 server 162 receives television content from the live acquisition server 152, or video-on-demand content from the VOD importer server 156 through the public network 196. The television and video-on-demand content can be sent by the TV2 server 162 to the OMT switch 160 and forwarded to a subscriber of the IPTV system 100 who accesses the public network 196 through the personal computer 198.

Figure 2:
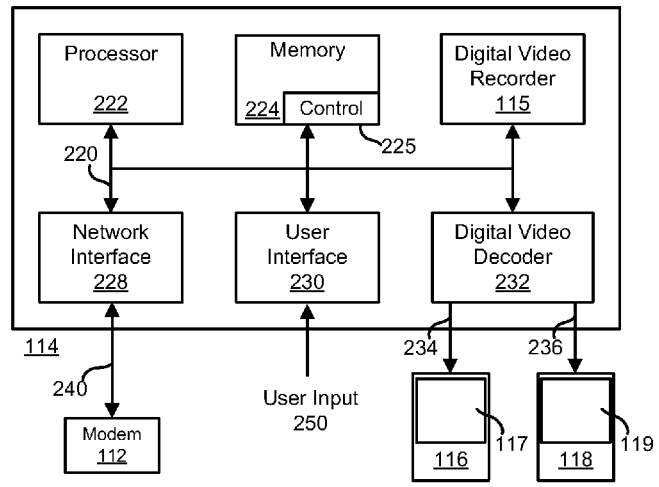
FIG. 2 is a schematic illustration of an embodiment of a set-top box for use in the IPTV system.

FIG. 2 is a schematic illustration of an embodiment of the set-top box 114. The set-top box 114 includes the DVR 115, a processor 222, a memory 224, a network interface 228, a user interface 230, and a digital video decoder 232. As illustrated, the control module 125 is preferably implemented as processor executable code in the memory 224. The network interface 228 receives a digital input 240 from the modem 112, and communicates with a bus 220. The processor 222, the memory 224, the DVR 115, the user interface 230, and the digital video decoder 232 are also coupled to the bus 220. The user interface 230 receives a user input 250. The digital video decoder 232 includes two outputs 234 and 236 that are coupled to the display devices 116 and 118, respectively. The DVR 115 can include a storage device, such as a hard drive, a non-volatile memory device, another storage device, or any combination thereof. The display devices 116 and 118 include a screen 117 and 119, respectively. A non-limiting example of a user interface 230 includes a keypad or touch panel included in the set-top box 114, a wireless interface for use with the remote control 120, another user interface, or any combination thereof.

The set-top box 114 exchanges information with the IPTV system 100 via the network interface 228, displays content from the digital input 240 on the display devices 116 and 118, and records content on the DVR 115. The digital input 240 includes digital information streams containing the content of various channels. The content on a digital information stream can be in a standard-definition (SD) format, or in a high-definition (HD) format. Based upon the user input 250, the set-top box 114 communicates with the IPTV system 100 to request the content from various SD channels and HD channels. Under the control of the processor 222 and the control module 125, the digital information streams are directed to the DVR 115 and/or to the digital video decoder 232 for display on the display devices 116 and 118. The digital information streams stored on the DVR 115 can also be directed to the digital video decoder 232 for display on the display devices 116 and 118.

A user interacts with the set-top box 114 by providing user input 250 to the user interface 230. Under the control of the processor 222 and the control module 125, the user can choose to view selected content from the digital input 240 or from the DVR 115 on the display devices 116 and 118, or to record selected content from the digital input 240 on the DVR 115. The control module 125 typically presents the user with options for viewing and recording through option menus depicted on the screens 117 and 119, and receives the user input 250 through the user interface 230.

The set-top box 114 can be configured to record several items of content onto the DVR 115, depending upon the type of content and the data storage capacity of the DVR 115. The set-top box 114 can be configured to receive content in an SD format, or in an HD format. In an embodiment, content in the HD format uses about ten times as much data storage capacity as similar content in the SD format. For example, a DVR 115 that can record two to three hundred hours of SD formatted content can typically only record twenty to thirty hours of HD formatted content. Thus, considering that an average length for a feature length movie is around two hours, in the range of one hundred to one hundred fifty SD formatted movies can typically be recorded in the same storage space as ten to fifteen HD formatted movies. Because the data storage capacity of the DVR 115 is limited, conflicts can arise when a user desires to record content when the DVR 115 is at or near its storage capacity.

To mitigate such conflicts, the control module 125 can implement a storage capacity management system for the DVR 115, such that new content can be recorded without exceeding the storage capacity of the DVR 115. FIGS. 3A-3F each show a utilization map of the capacity, utilization and available space of the DVR 115. The control module 125 segments the DVR 115 with threshold levels 310 and 320. It will be appreciated that the threshold levels can be determined with reference to the specific set-top box 114 and the DVR 115 used, and the rate at which available capacity is consumed while recording content. As illustrated, threshold level 310 segments about seventy-five percent of the DVR 115 capacity, and threshold level 320 segments about ninety percent of the DVR 115 capacity.

Figure 3:
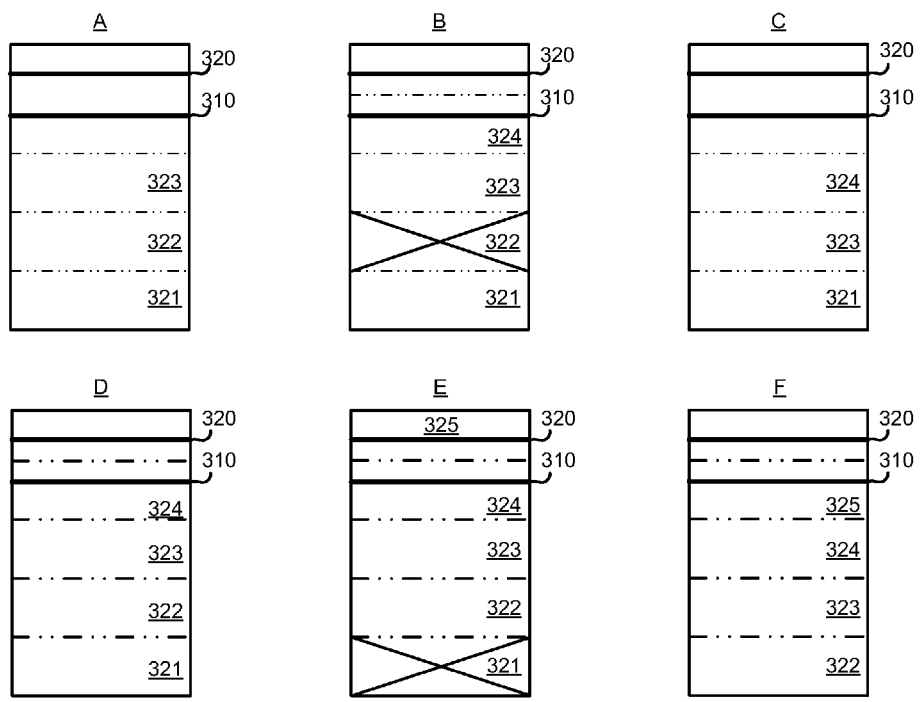
FIGS. 3A-3F illustrate several utilization maps of the capacity, utilization, and available space of a storage device in the set-top box.

In the utilization map of FIG. 3A, DVR 115 includes content 321, content 322, and content 323. About two thirds of the DVR 115 capacity is utilized, leaving about one third available for storing additional content. When a user places a request to record additional content, the control module 125 begins to record the additional content. For example, the utilization map of FIG. 3B shows that the addition of content 324 stored on the DVR 115 increases the utilization of the DVR 115 to about eighty percent, leaving only about twenty percent available for storing additional content. While the content 324 is being recorded, the control module 125 compares the utilization of the DVR 115 with the first threshold 310. When the utilization of the DVR 115 exceeds the first threshold 310, the control module 125 presents the user with an option to continue recording content 324 or to discontinue the recording.

Figure 4:
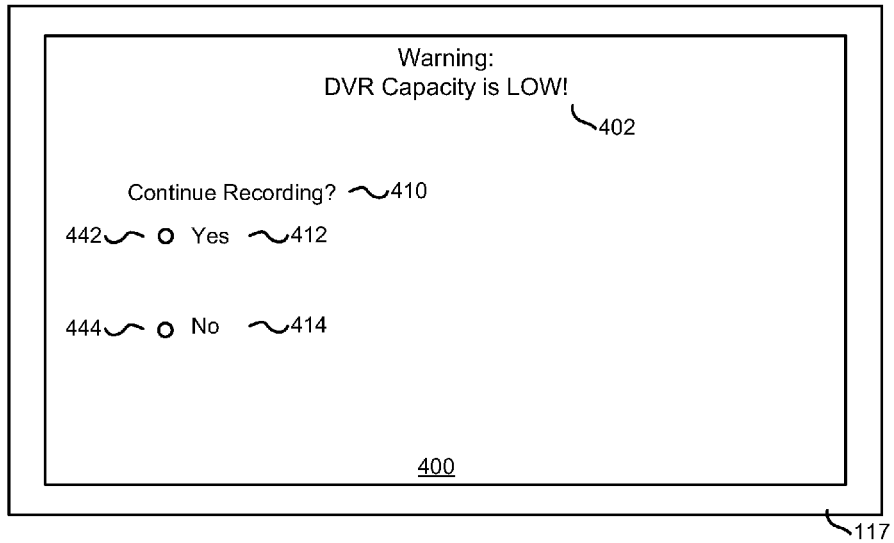
FIG. 4 illustrates an embodiment of a warning screen depicted on a display device.

FIG. 4 illustrates an embodiment of a warning screen 400 depicted on, for example, the screen 117. The warning screen 400 includes a warning banner 402, a selection banner 410, selection options 412 and 414, and selection bubbles 442 and 444. The warning banner 402 presents a message that the DVR available capacity of the DVR 115 is too low. The selection banner 410 prompts the user to select an option as to whether or not to continue recording. The selection options 412 and 414 provide options for continuing recording of the content 324 via the selection option 412, labeled "Yes," or discontinuing recording via the selection option 414, labeled "No." The selection options 412 and 414 include selection bubbles 442 and 444 for indicating which selection option 412 or 414 is selected, respectively. The user provides a user input 250, selecting one of the available selection bubbles 442 or 444 to indicate to the control module 125 whether to continue recording content 324, or to discontinue the recording.

If the user chooses to discontinue recording, then the control module 125 discontinues recording content 324, and the capacity, utilization, and available space of DVR 115 returns to the state shown in the utilization map of FIG. 3A. However, if the user chooses to continue recording, then the control module 125 presents the user with options for selecting content to delete from the DVR 115, in order to reduce the utilization of the DVR 115.

Figure 5:
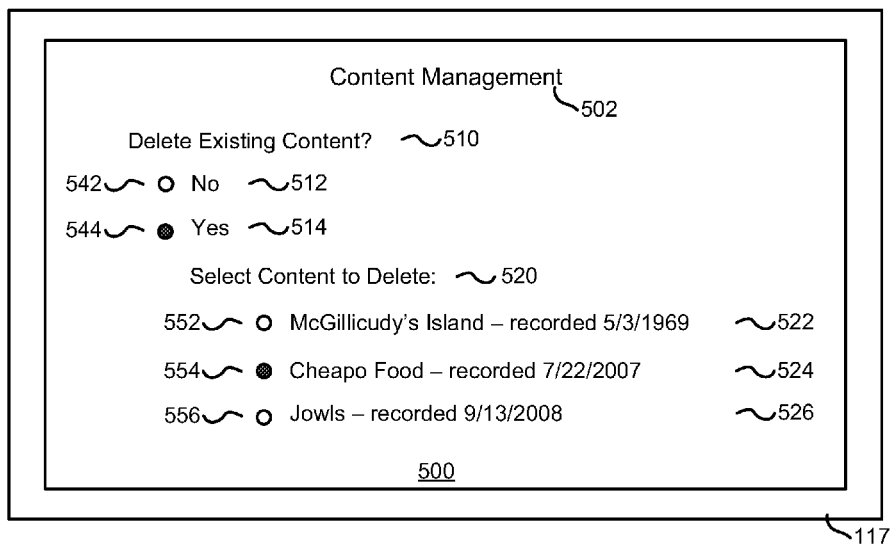
FIG. 5 illustrates an embodiment of a content management screen depicted on the display device.

FIG. 5 illustrates an embodiment of a content management screen 500 depicted on, for example, the screen 117. The content management screen 500 includes a content management banner 502, selection banners 510 and 520, selection options 512, 514, 522, 524 and 526, and selection bubbles 542, 544, 552, 554, and 556. The content management banner 502 provides a title for the content management screen 500. The selection banner 510 prompts the user to select an option to delete previously recorded content (such as the content 321, content 322, and content 323), or not. The selection options 512 and 514 provide options for not deleting previously recorded content via the selection option 512, labeled "No," or deleting previously recorded content via the selection option 514, labeled "Yes." The selection options 512 and 514 include selection bubbles 540 for indicating which selection option 512 or 514 is selected. The user provides a user input 250, selecting one of the available selection bubbles 542 or 544 to indicate to the control module 125 whether to delete previously recorded content, or not, respectively.

If the user chooses to delete previously recorded content via the selection option 514, then the selection banner 520 prompts the user to select which content 321, content 322, or content 323 to delete. The selection options 522, 524, and 526 provide options for selecting to delete the content 321 via the selection option 522, labeled "McGillicudy's Island—recorded May 3, 1969," to delete the content 322 via the selection option 524, labeled "Cheapo Food—recorded Jul. 22, 2007," or to delete the content 323 via the selection option 526, labeled "Jowls—recorded Sep. 13, 2008." The selection options 522, 524, and 526 include selection bubbles 552, 554, and 556 for indicating which selection option 522, 524, or 526, respectively, is selected. The user provides a user input 250, selecting one of the available selection bubbles 552, 554, or 556 to indicate to the control module 125 which previously recorded content to delete. For example, the utilization map of FIG. 3B shows that the user has chosen to delete previously recorded content via the selection bubble 544, and to delete the content 322 via the selection bubble 554, as shown in FIG. 5. The DVR control module 225 deletes the selected content 322 to make room for the new content 324, as shown in the utilization map of FIG. 3C. If, on the other hand, the user chooses to not delete previously recorded content via selection bubble 542, recording of the content 325 continues, and the utilization of the storage capacity on DVR 115 is permitted to exceed the first threshold 310, as shown in the utilization map of FIG. 3D.

When the user places another request to record additional content 325, the control module 125 recognizes that the utilization of the DVR 115 exceeds the first threshold 310, and presents the user with the option to continue recording the content 325 or to discontinue the recording via the warning screen 400. If the user chooses to continue recording, then the control module 125 presents the user with options for selecting content to delete from the DVR 115 via the content management screen 500. Here, if the user chooses to not delete previously recorded content via selection bubble 542, recording of the content 325 continues, and the control module 125 continues to monitor the utilization of the DVR 115. When the utilization of the DVR 115 exceeds the second threshold 320, the control module 125 automatically deletes previously recorded content to lower the utilization of the DVR 115, making room for the content 325. The utilization map of FIG. 3E shows that recording content 325 results in utilization in excess of the second threshold 320. As a result, the DVR control module has selected the content 321 to delete. The utilization map of FIG. 3F shows the result of deleting content 321.

Figure 6:
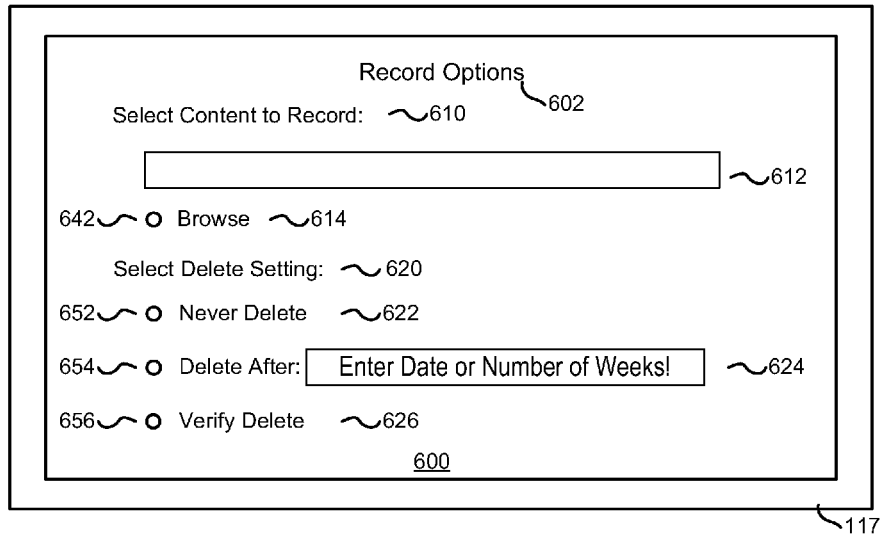
FIG. 6. illustrates an embodiment of a recording options screen depicted on the display device.

When the utilization of the DVR 115 exceeds the second threshold 320, the control module 125 can automatically delete previously recorded content to lower the utilization of the DVR 115 based upon various criteria, such as recording date, usage, size, another criteria, or any combination thereof. For example, in a particular embodiment, the control module 125 can examine the previously recorded content stored on the DVR 115 and select the earliest recorded content for deleting, or select content that was recorded prior to a certain date. In another embodiment, the control module 125 can examine usage statistics on the previously recorded content and select a less often viewed content for deleting. The selection criteria can be user defined or predetermined by the DVR manufacturer.

Where the selection criteria are user defined, the control module 125 can present the user with selection options (not illustrated) to globally set the selection criteria at some time before selecting to record content. Such global selection criteria can also be used as default settings for deleting content when the utilization of the DVR 115 exceeds either the first threshold 310 or the second threshold 320. Use of such a default setting can permit operation of the storage capacity management system, even if the user is not present to select from among the various options. In another embodiment, the control module 125 can present the user with recording options for deleting content at the time the user requests to record the content. FIG. 6. shows an embodiment of a recording options screen 600 depicted on, for example, the screen 117 on the display 116. The recording options screen 600 includes a recording options banner 602, selection banners 610 and 620, selection options 612, 614, 622, 624 and 626, and selection bubbles 642, 652, 654, and 656. The recording options banner 602 provides a title for the record options screen 600. The selection banner 610, labeled "Select Content to Record," prompts the user to select content to record. The selection option 612 provides a field where the user can enter the name of the content to record. The selection option 614, labeled "Browse," provides a selection that displays a separate screen (not illustrated) where the user can browse for content to record. The selection banner 520, labeled "Select Delete Setting," prompts the user to select a delete setting for the content. The selection option 522, labeled "Never Delete," marks the content such that it will not be automatically deleted. The selection option 524, labeled "Delete After," provides a field for entering a time duration or a date such that the content will not be automatically deleted until after the selected time duration or date. The selection option 626, labeled "Verify Delete," marks the content such that it will not be automatically deleted until the delete operation has been verified by the user.

In another embodiment, the channel selection, viewing and recording on the set-top box 114 can be under the control of a set-top box application 143 in the application server 142.

Here, a user interacts with the set-top box 114 by providing user input 250 to the user interface 230 to choose to view or record selected, and the user input 250 is communicated from the set-top box 114 to the set-top box application 143. The set-top box application 143 communicates with the set-top box 114 to present the user with options for viewing and recording, and implements a storage capacity management system for the DVR 115, such that new content can be recorded on the set-top box 114 without exceeding the storage capacity of the DVR 115. Here, when the user places a request to view or record content, the set-top box application 143 monitors the utilization of the DVR 115. If the utilization exceeds thresholds similar to the thresholds 310 and 320, the set-top box application 200 presents the user with screens similar to the warning screen 400 and the content management screen 500, and the user provides a user input 250, selecting from among the available options to indicate whether or not to continue recording, whether or not to delete previously recorded content, and, if so, which previously recorded content to delete.

Figure 7:
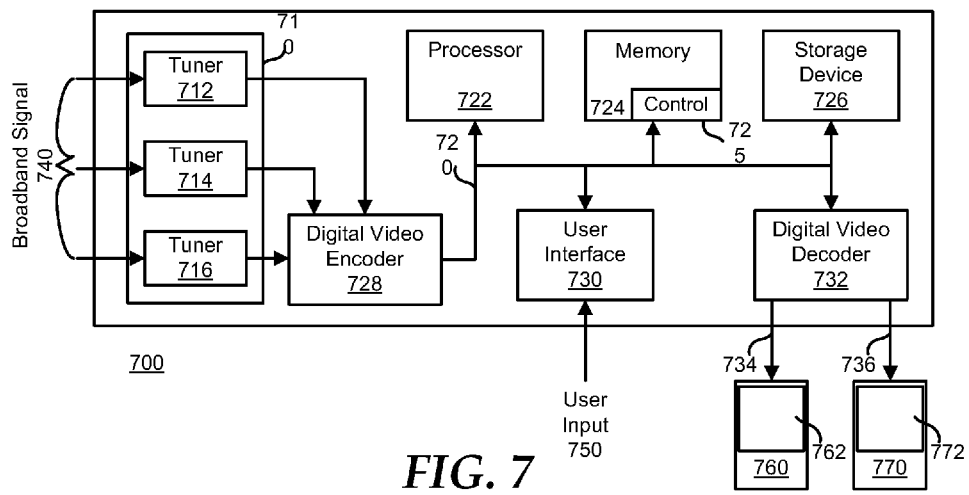
FIG. 7 is a schematic illustration of an embodiment of a stand-alone digital video recorder.

In a further embodiment of the present disclosure, a stand-alone DVR can be connected to a broadband signal source, such as a terrestrial signal obtained from an aerial antenna or satellite downlink, a cable television service, another broadband signal, or any combination thereof. FIG. 7 shows an embodiment of a stand-alone DVR 700. The stand-alone DVR 700 includes a receiver 710, a processor 722, a memory 724, a storage device 726, a digital video encoder 728, a user interface 730, and a digital video decoder 732. As illustrated, the memory 724 includes a control module 725 that functions similarly to the control module 125, and that may preferably be implemented as processor executable code. The storage device 726 can include a hard drive, a non-volatile memory device, another storage device, or any combination thereof.

The receiver 710 includes three tuners 712, 714, and 716. The digital video encoder 728 receives an input from each tuner 712, 714, and 716, and sends an output to a bus 720. The processor 722, the memory 724, the storage device 726, the user interface 730, and the digital video decoder 732 are also coupled to the bus 720. The tuners 712, 714, and 716 receive a broadband signal 740. The user interface 730 receives a user input 750. The digital video decoder 732 includes two outputs 734 and 736 that are coupled to display devices 760 and 770, respectively. The display devices 760 and 770 each include a screen 762 and 772, respectively.

The stand-alone DVR 700 receives the broadband signal 740 at the receiver 710, tunes to a desired channel, and either displays or records the content presented on the channel. The broadband signal 740 includes signals that are modulated onto the various channels. The tuners 712, 714, and 716 tune in one selected channel. The tuners 712, 714, and 716 also demodulate the content from the channel and output the demodulated content to the digital video encoder 728.

The digital video encoder 728 receives the demodulated signals and converts them into digital data. Under the control of the processor 722 and the control module 725, the digital data can be directed to the storage device 726 or to the digital video decoder 732 to be converted to signals suitable for display on the display devices 760 and 770. Likewise, digital data stored on the storage device 726 can be directed to the digital video decoder 732 for display on the display devices 760 and 770. In another embodiment (not illustrated), the signals from the tuners 712, 714, and 716 can be switched to the outputs 734 and 736 for display on the display devices 760 and 770, without passing through the digital video encoder 728 and the digital video decoder 732, but the digital video encoder 728 still converts the signals into digital content for recording.

A user interacts with the stand-alone DVR 700 by providing user input 750 to the user interface 730. Under the control of the processor 722 and the control module 725, the user can choose to view selected content from the broadband signal 740 or the storage device 726 on the display devices 760 and 770, or to record selected content from the broadband signal 740 on the storage device 726. In one embodiment, the control module 725 presents the user with options for viewing and recording, receives the user input 750 through the user interface 730, and implements a storage capacity management system for the storage device 726, such that new content can be recorded without exceeding the storage capacity of the storage device 726. Here, when the user places a request to view or record content, the control module 725 monitors the utilization of the storage device 726. If the utilization exceeds thresholds similar to the thresholds 310 and 320, the control module 725 presents the user with screens similar to the warning screen 400 and the content management screen 500, and the user provides a user input 750, selecting from among the available options to indicate whether or not to continue recording, whether or not to delete previously recorded content, and, if so, which previously recorded content to delete.

Figure 8:
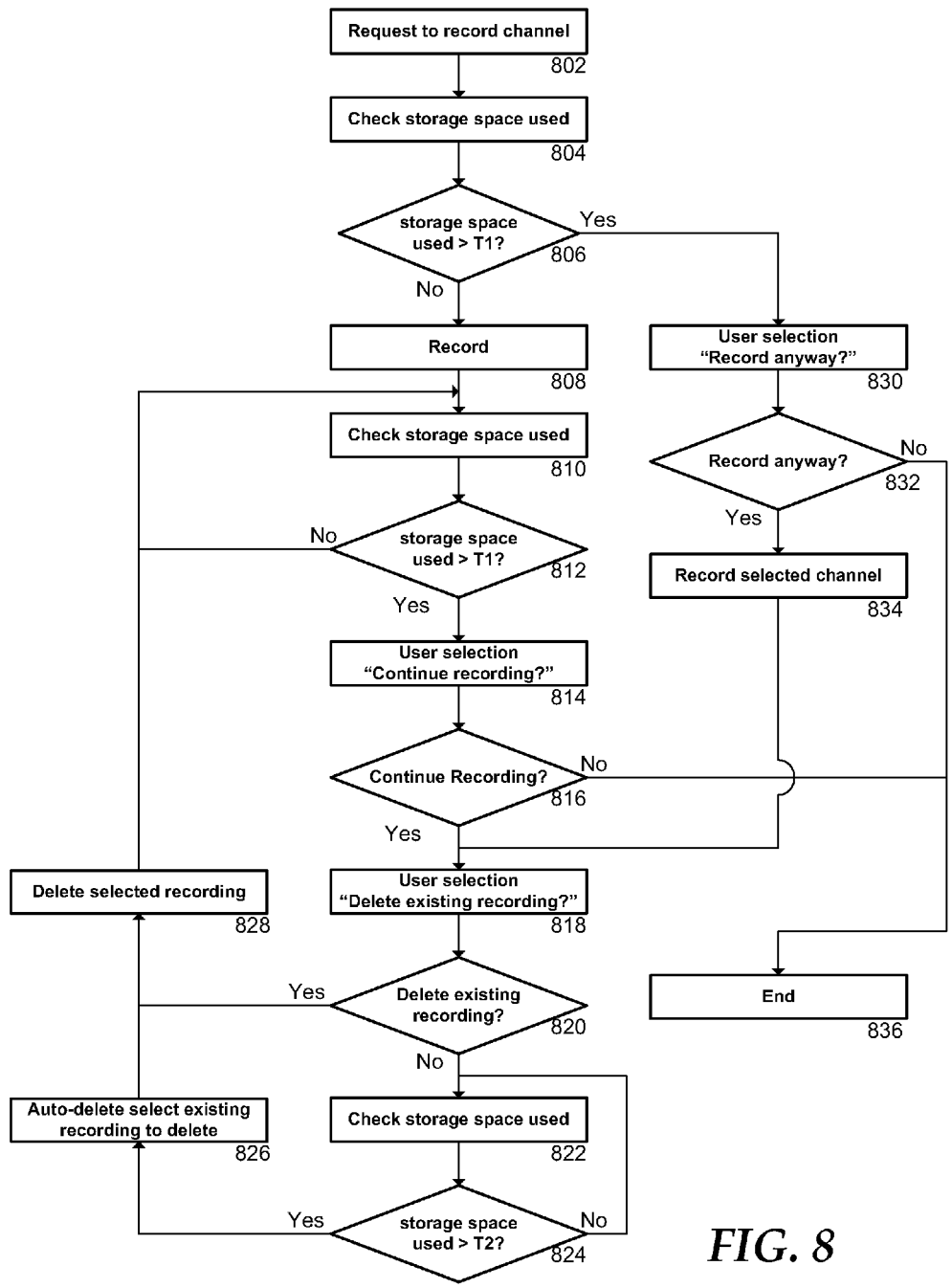
FIG. 8 illustrates an embodiment of a method of managing storage capacity on an IPTV system with a set-top box.

FIG. 8 illustrates an embodiment of a method of managing storage capacity on an IPTV system 100 with a set-top box 114 in a flow chart form. The set-top box application 143 receives a request from the set-top box 114 to record content on the DVR 115 in block 802. The set-top box application 143 checks the utilization of the DVR 115 in block 804. A decision is made whether the utilization of the DVR 115 is greater than the first threshold 310 in decision tree 806. If not, then the "No" branch is taken and the set-top box application 143 directs the set-top box 114 to record the content in block 808. The set-top box application 143 re-checks the utilization of the DVR 115 in block 810. A decision is made whether the utilization of the DVR 115 is greater than the first threshold 310 in decision tree 812. If not, then the "No" branch is taken and processing returns to block 810 where the set-top box application 143 re-checks the utilization of the DVR 115.

If the utilization of the DVR 115 is greater than the first threshold 310 in decision tree 812, then the "Yes" branch is taken and the set-top box application 143 directs the set-top box 114 to display the warning screen 400, prompting the user to select between continuing or discontinuing the recording in block 814. A decision is made whether to continue the recording in decision tree 816. If not, the "No" branch is taken and further processing ends in block 836. If the selection is made to continue recording in decision tree 816, then the "Yes" branch is taken the set-top box application 143 directs the set-top box 114 to display the content management screen 500, prompting the user to select between deleting previously recorded content or not, and if selecting to delete previously recorded content, to further select the content to delete in block 818. A decision is made whether to delete previously recorded content in decision tree 820. If so, the "Yes" branch is taken and the set-top box application 143 directs the set-top box 114 to delete the previously recorded content selected in block 818, in block 828, and processing returns to block 810 where the set-top box application 143 re-checks the utilization of the storage device 726.

If the selection is made to not delete previously recorded content in decision tree 820, the "No" branch is taken and the set-top box application 143 checks the utilization of the storage device 726 in block 822. A decision is made whether the utilization of the DVR 115 is greater than the second threshold 320 in decision tree 824. If not, then the "No" branch is taken and processing returns to block 822 where the set-top box application 143 re-checks the utilization of the DVR 115. If the utilization of the DVR 115 is greater than the second threshold 320 in decision tree 824, the "Yes" branch is taken and the set-top box application 143 selects previously recorded content to delete, and processing returns to block 828 where the set-top box application 143 directs the set-top box 114 to delete the previously recorded content, as selected in block 826.

If the utilization of the DVR 115 is greater than the first threshold 310, as determined in decision tree 812, the "Yes" branch is taken and the set-top box application 143 directs the set-top box 114 to display the warning screen 400, prompting the user to select between continuing or discontinuing the recording in block 830. A decision is made whether to continue the recording in decision tree 832. If not, the "No" branch is taken and further processing ends in block 836. If the selection is made to continue recording in decision tree 832, then the "Yes" branch is taken the set-top box application 143 directs the set-top box 114 to record the content in block 834, and processing continues in block 818 where the set-top box application 143 directs the set-top box 124 to display the content management screen 500, prompting the user to select between deleting previously recorded content or not, and if selecting to delete previously recorded content, to further select the content to delete.

Figure 9:
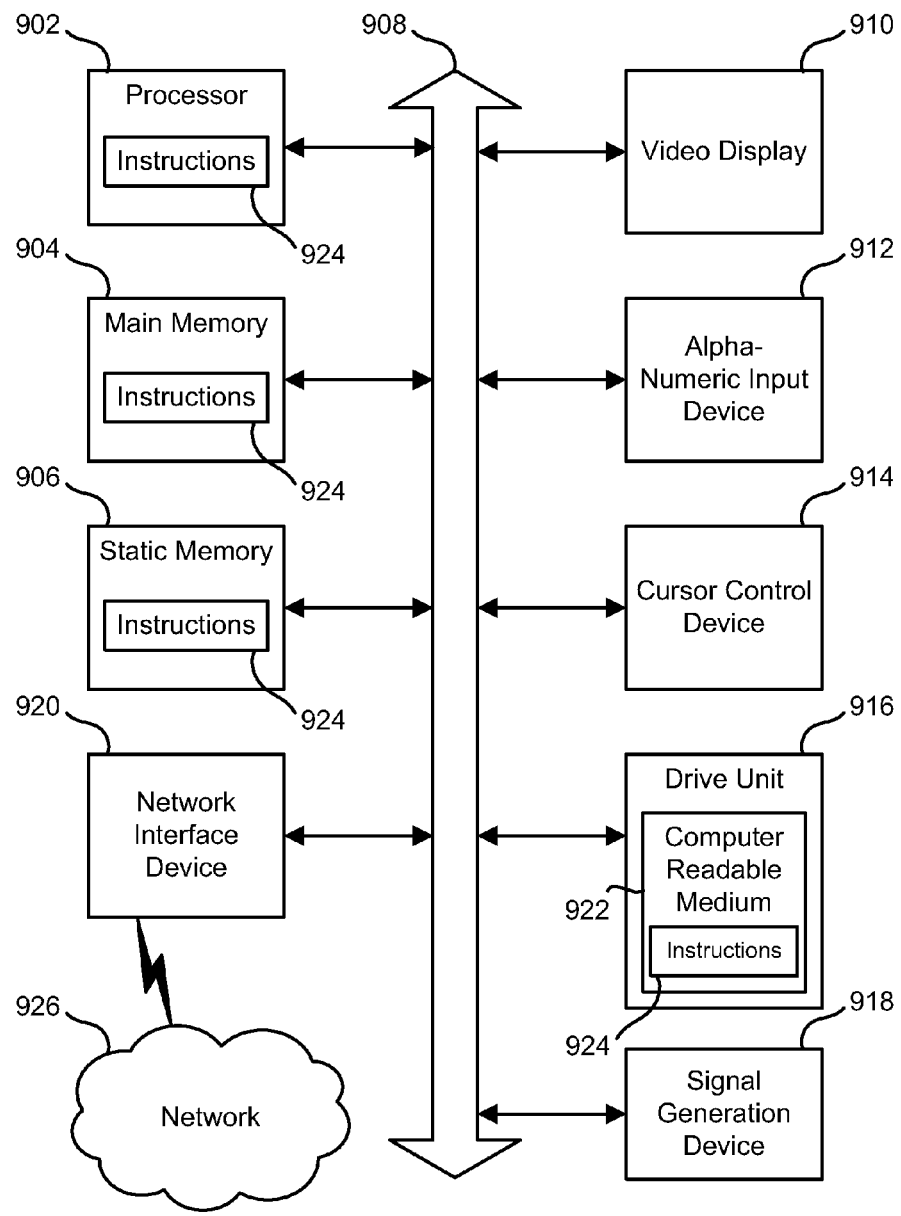
FIG. 9 shows an illustrative embodiment of a general computer system in accordance with at least one embodiment of the present disclosure.

FIG. 9 shows an illustrative embodiment of a general computer system 900 in accordance with at least one embodiment of the present disclosure. The computer system 900 can include a set of instructions that can be executed to cause the computer system 900 to perform any one or more of the methods or computer based functions disclosed herein. The computer system 900 may operate as a standalone device or may be connected via a network to other computer systems or peripheral devices.

In a networked deployment, the computer system may operate in the capacity of a server or as a client computer in a server-client network environment, or as a peer computer system in a peer-to-peer (or distributed) network environment. The computer system 900 can also be implemented as or incorporated into various devices, such as a personal computer (PC), a tablet PC, a set-top box, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 900 can be implemented using electronic devices that provide voice, video or data communication. Further, while a single computer system 900 is illustrated, the term "system" shall also be taken to include any collection of systems or sub-systems that individually or jointly execute a set, or multiple sets, of instructions to perform one or more computer functions.

The computer system 900 may include a processor 902 such as a central processing unit (CPU), a graphics processing unit (GPU), or both. Moreover, the computer system 900 can include a main memory 904 and a static memory 906 that can communicate with each other via a bus 908. As shown, the computer system 900 may further include a video display unit 910, such as a liquid crystal display (LCD), an organic light emitting diode (OLED), a flat panel display, a solid state display, or a cathode ray tube (CRT). Additionally, the computer system 900 may include an input device 912, such as a keyboard, and a cursor control device 914, such as a mouse. The computer system 900 can also include a disk drive unit 916, a signal generation device 918, such as a speaker or remote control, and a network interface device 920.

In a particular embodiment, the disk drive unit 916 may include a computer-readable medium 922 in which one or more sets of instructions 924 can be embedded. Further, the instructions 924 may embody one or more of the methods or logic as described herein. In a particular embodiment, the instructions 924 may reside completely, or at least partially, within the main memory 904, the static memory 906, and/or within the processor 902 during execution by the computer system 900. The main memory 904 and the processor 902 also may include computer-readable media. The network interface device 920 can provide connectivity to a network 926 such as a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software code executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 924 or receives and executes instructions 924 responsive to a propagated signal, so that a device connected to a network 926 can communicate voice, video or data over the network 926. Further, the instructions 924 may be transmitted or received over the network 926 via the network interface device 920.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A set-top box, comprising:
a memory having executable instructions; and
a controller coupled to the memory, wherein executing the instructions causes the controller to perform operations comprising:
selecting a first threshold and a second threshold, wherein the first threshold is less than a storage capacity of a content memory of the set-top box and defined as a first fraction of the storage capacity, and wherein the second threshold is less than the storage capacity of the content memory, greater than the first threshold, and defined as a second fraction of the storage capacity;
receiving a first request to record first content;
initiating a recording of the first content for storage in the content memory;
monitoring a utilization of the storage capacity of the content memory while the first content is being recorded in the content memory without displaying a memory usage prompt until the utilization exceeds the first threshold;
in response to the utilization exceeding the first threshold:
displaying a first prompt, while the first content is being recorded, to select a first option to continue recording the content or a second option to cease recording of the first content;
in response to receiving the second option, ceasing the recording of the first content; and
in response to receiving the first option:
continuing recording the first content;
displaying a second prompt, while the first content is being recorded, to select a third option to delete one of a first plurality of pre-recorded content items stored in the content memory or a fourth option to not delete one of the first plurality of pre-recorded content items;
in response to receiving the third option, receiving a first selection of the first content to delete from the first plurality of pre-recorded content items stored in the content memory, and deleting the first selection from the content memory; and
in response to receiving the fourth option:
continuing to record the first content past the first threshold; and
monitoring the utilization of the storage capacity of the content memory while the first content is being recorded in the content memory without displaying the memory usage prompt until the utilization exceeds the second threshold and in response to the utilization exceeding the second threshold during the recording of the first content, automatically deleting pre-recorded content in the content memory;
in response to an additional request to record second content when the utilization exceeds the first threshold, displaying a third prompt to select a fifth option to continue recording the second content or a sixth option to discontinue recording of the second content;
in response to receiving the fifth option, presenting a fourth query to select a seventh option to delete content or an eighth option to not delete content;
in response to receiving the sixth option, cancelling the additional request;
responsive to a selection of the seventh option, receiving a second selection of the second content to delete from a second plurality of pre-recorded content items stored in the content memory, and deleting the second selection from the content memory; and
responsive to a selection of the eighth option, recording the second content into the content memory and when the utilization exceeds the second threshold, automatically deleting pre-recorded content in the content memory.

2. The set-top box of claim 1, wherein the automatically deleted content is selected as a result of selecting an earliest pre-recorded content item stored in the memory.

3. The set-top box of claim 1, wherein the automatically deleted content is selected as a result of selecting a least often viewed pre-recorded content item stored in the memory.

4. A digital video recorder, comprising:
a storage device having executable instructions; and
a controller coupled to the storage device, wherein executing the instructions causes the controller to perform operations comprising:
  selecting a first threshold and a second threshold, wherein the first threshold is less than a storage capacity of a storage device of the digital video recorder and defined as a first fraction of the storage capacity, and wherein the second threshold is less than the storage capacity of the storage device, greater than the first threshold, and defined as a second fraction of the storage capacity;
  initiating a recording of content for storage in the storage device of the digital video recorder;
  displaying a set of selectable options regarding the content, the selectable options comprising delete settings including a selectable date for automatically deleting the content;
  monitoring a utilization of the storage capacity of the storage device of the digital video recorder while the storage device is recording the content without prompting a user until the utilization exceeds the first threshold;
  in response to the utilization exceeding the first threshold:
    displaying a first query, while the storage device is recording the content, that prompts a selection of one of selecting pre-recorded content in the storage device to delete in order to reduce the utilization to a level below the first threshold or a selection to not delete the pre-recorded content in the storage device, wherein the first query is displayed independently of a size of the content;
    in response to receiving the selection of selecting pre-recorded content to delete, selecting first content to delete from a plurality of pre-recorded content items stored in the storage device, and deleting the first content from the storage device; and
    in response to receiving a selection to not delete:
      deleting no content from the storage device and continuing to record the content;
  monitoring the utilization of the storage capacity of the storage device while the first content is being recorded in the storage device without prompting the user until the utilization exceeds a second threshold;
  in response to the utilization exceeding the second threshold while recording the content:
    selecting second content in the storage device without receiving a signal external to the digital video recorder corresponding to a selection of the second content;
    automatically deleting the second content from the storage device;
  in response to an additional request to record additional content when the utilization exceeds the first threshold, displaying a second query, the second query including an option to continue recording the additional content or an option to discontinue recording the additional content;
  in response to receiving the discontinue recording option, cancelling the additional request;
  in response to receiving the option to continue recording, presenting a third query, the third query including a delete content selection or a not delete content selection;
    responsive to a selection of the delete content selection, receiving a second selection of the additional content to delete from a second plurality of pre-recorded content items stored in the storage device, and deleting the second selection from the storage device; and
    responsive to the not delete selection, recording the additional content into the storage capacity of the storage device and when the utilization exceeds the second threshold, automatically deleting pre-recorded content in the storage capacity of the storage device.

5. The digital video recorder of claim 4, wherein the second content is selected as a result of selecting an earliest pre-recorded content stored in the storage device.

6. The digital video recorder of claim 4, wherein the second content is selected as a result of selecting a least often viewed pre-recorded content stored in the storage device.

7. A method comprising:
initiating a recording of content in a digital video recorder;
selecting a first threshold and a second threshold, wherein the first threshold is less than a storage capacity of a memory space of the digital video recorder and defined as a first fraction of the storage capacity, and wherein the second threshold is less than the storage capacity of the memory space, greater than the first threshold, and defined as a second fraction of the storage capacity;
displaying a set of selectable options regarding the content, the selectable options comprising delete settings including a selectable date for automatically deleting the content;
determining a utilization of storage capacity of the memory space in the digital video recorder while the digital video recorder is recording the content without prompting a user until the utilization exceeds the first threshold;
in response to the utilization exceeding the first threshold:
  displaying a query, while the digital video recorder is recording the content, that prompts a selection of one of choosing content in the digital video recorder to delete in order to reduce the utilization to a level below the first threshold or to not delete the content in the digital video recorder, wherein the query is displayed independently of a size of the content; and
  in response to receiving a selection of first content to delete from the content stored in the digital video recorder, deleting the first content from the digital video recorder; and
  in response to receiving a selection to not delete content from the digital video recorder, continuing recording past the first threshold;
in response to the utilization exceeding the second threshold while recording the content past the first threshold:
  selecting second content stored in the digital video recorder without receiving a signal from a source external to the digital video recorder corresponding to a selection of the second content;
automatically deleting the second content from the digital video recorder;
in response to an additional request to record additional content when the utilization exceeds the first threshold, displaying a second query to choose to continue recording the additional content or to discontinue recording the additional content;
  in response to receiving the choice to continue recording, presenting a third query to choose to delete content or to not delete content;
  in response to receiving the discontinue recording choice, cancelling the additional request;

responsive to the delete content choice, receiving a second selection of the second content to delete from a second plurality of pre-recorded content items stored in the storage capacity of the memory space, and deleting the second selection from the memory space; and responsive to the choice to not delete, recording the additional content into the storage capacity of the memory space and when the utilization exceeds the second threshold, automatically deleting pre-recorded content in the storage capacity of the memory space.

8. The method of claim 7, wherein selection of the second content is based on selection criteria selected at a time the second content is stored in the digital video recorder.

9. The method of claim 8 comprising displaying a query at the time the second content is stored in the digital video recorder that prompts a request for information to generate the selection criteria.

10. The method of claim 9 wherein the selection criteria includes selecting an earliest recorded content stored in the digital video recorder.

11. The method of claim 9 wherein the selection criteria includes selecting a least often viewed content stored in the digital video recorder.

\* \* \* \* \*